Dec. 20, 1966   E. JETTE, JR   3,292,726
AUTOMOBILE SAFETY DEVICE HAVING ROOF REINFORCING BAR
Filed Dec. 21, 1964   2 Sheets-Sheet 1

INVENTOR.
EMILE JETTE JR.
BY John Cyril Malloy
ATTORNEY

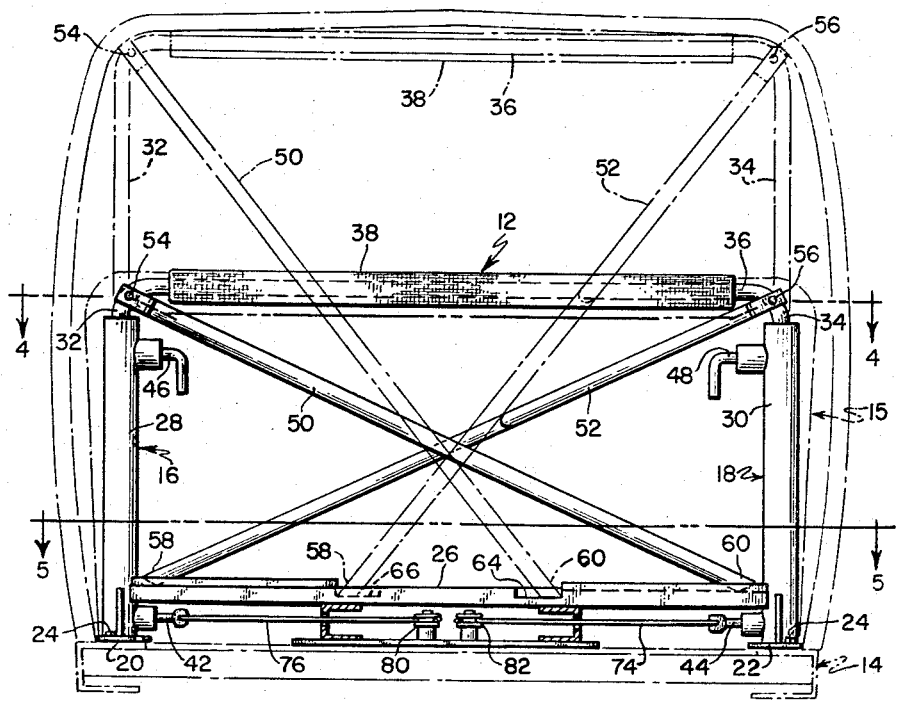

United States Patent Office 3,292,726
Patented Dec. 20, 1966

3,292,726
AUTOMOBILE SAFETY DEVICE HAVING ROOF
REINFORCING BAR
Emile Jette, Jr., 1829 NW. 92nd St.,
Miami, Fla. 33147
Filed Dec. 21, 1964, Ser. No. 419,851
15 Claims. (Cl. 180—82)

This invention relates to a safety device for an automobile and more particularly to a transverse bar arranged to automatically move upwardly to reinforce the roof of the cab of an automobile in the event of an accident so that it will not be crushed if the automobile is rolled over.

As is perhaps well known, it is quite common that an automobile accident causes a car to flip or to roll over with consequent injury to the occupants by reason of the roof being crushed. It is because cars often turn over that many persons, who might otherwise use an automobile commonly known as a convertible top, insist on the purchase of a rigid roofed automobile.

It is an object of this invention to provide a transverse roof reinforcing bar for installation in automobiles and arranged to be driven upwardly upon a severe impact on the automobile so that, in the event the automobile rolls over, the bar will reinforce the roof or, in the case of a convertible top, provide a protective shield over the heads of the occupants.

It is another object of this invention to provide a safety device for an automobile for reinforcing the roof, the said device in a normally lowered position behind the front seat of the automobile and adapted to be driven upwardly into companulate reinforcing relation with the interior of the roof so that in the event of an impact the roof will be reinforced so that it does not collapse in the event the automobile rolls over.

It is another object of this invention to provide a retracted transverse reinforcing bar arranged in the cab of a vehicle and responsive to an impact upon the automobile of such magnitude as to tip the automobile over or to tend to tip the automobile over so as to actuate mechanism for driving the reinforcing bar upwardly into companulate relation with the roof of the cab.

It is a general object of this invention to provide an automobile safety device of the type described more fully hereinafter which is relatively inexpensive in construction, automatically operable in the event of a severe impact, and sufficiently sturdy for reinforcement of the roof of a cab of a vehicle.

In accordance with these and other objects which will become apparent hereinafter, the instant invention will now be described with reference to the accompanying drawings illustrating preferred embodiment thereof.

In the drawings:

FIGURE 2 is a rear elevation view of the structure of the instant invention shown in solid lines in FIGURE 1;

FIGURE 3 is a side elevation view of the structure in FIGURE 2;

FIGURE 4 is a plan view, partly in cross section, taken along the plane of the line 4—4 of FIGURE 2 and looking in the direction of the arrows; and FIGURE 5 is a plan view, partly in cross section, taken along the plane of the line 5—5 of FIGURE 2 and looking in the direction of the arrows.

Figure 1:
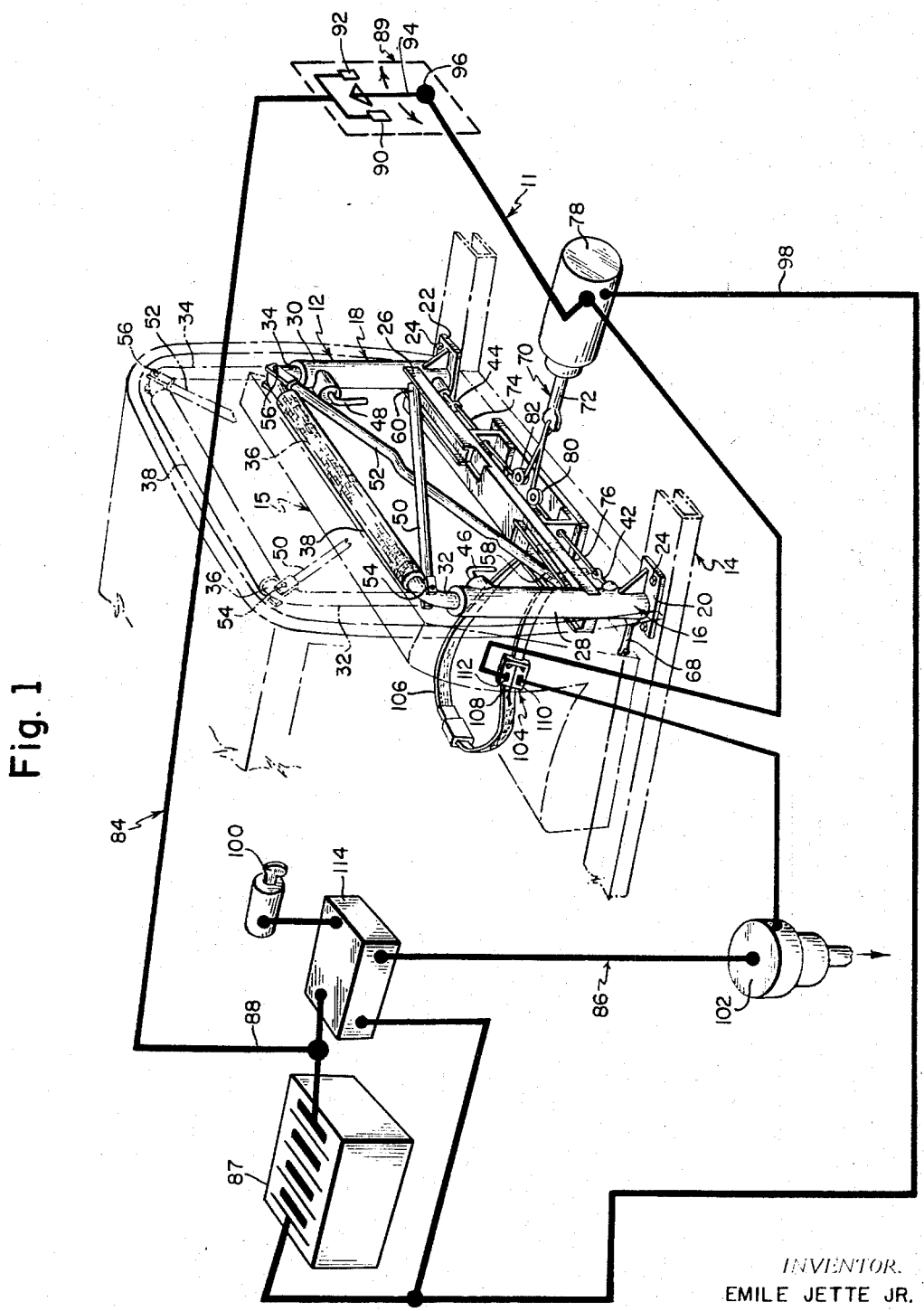
FIGURE 1 is a partial perspective view showing in phantom lines the interior of a cab of a vehicle and illustrating the conventional front seat and the installation of the structure of the instant invention wtih the electrical actuating circuit being shown schematically.

Referring more particularly to the drawings, wherein like reference characters designate like or corresponding parts throughout the different views, and referring particularly to FIGURE 1, the numerals 11 and 12 generally designate, respectively, the electrical circuit and the structure of the instant invention.

The structure is adapted to be mounted to the frame 14 of an automobile in a transverse plane behind the front seat 15 in the automobile cab, preferably nested closely adjacent the seat, as shown. The structure includes an upper transverse roll bar 36, which as will be explained, is adapted to move upwardly into the roof reinforcing position shown in dotted lines in FIGURE 1 as well as FIGURE 2. The roll bar 36, which may be padded as at 38, is supported at each end by a first and a second spaced telescoping support leg 16 and 18, each of which is provided at their respective lower ends with a mounting plate 20 and 22 for securing attachment of the structure to the frame of an auto as by the bolts 24. As shown, each of the telescoping legs includes a lower cylindrical housing, 28 and 30, and an upper telescoping extension 32 and 34 which extensions are integral with the roll bar 36 and are slideably housed within their respective lower cylindrical housings of the support legs in piston fashion.

In a manner to be explained, on the occurrence of an impact to the auto, the roll bar 36 and extensions 32 and 34 carried thereby are adapted to be driven upwardly and held in the companulate relation with the roof of the cab which is indicated by the dotted lines of FIGURE 1 to reinforce it. Normally, the roll bar will be in the collapsed or down position shown in FIGURE 1, i.e., in the nested position behind the driver's seat, in which position it is restrained from upward movement by restraining means, such as the detent pins 42 and 44 which normally engage and hold the telescoping extension in the down positions in the housings of the legs. On the occasion of an impact sufficient to roll the car over or tending to roll it over, and irrespective of whether the automobile is standing still or moving, means are provided to drive the roll bar 36 upwardly to reinforce the roof so that it will not be crushed to expose the occupants to severe injury. To this end, each of the cylindrical housings 28 and 30 of the leg supports may include a compressed spring, not shown, or other energy supply, to drive the roll bar and the extensions upwardly. Limit pins 46 and 48, normally urged inwardly or radially of the main center line of the legs, may be provided to automatically seat in sockets, not shown, provided in the telescoping extensions to limit the upward movement of the roll bar and support it in the up position. It is apparent that alternative means may be provided to supply the energy for raising the roll bar into reinforcing companulate relations with the automobile roof, such as electrical means or hydraulic means. To further strengthen the structure aforesaid an intermediate support bar 26 may be provided as a transverse support for the legs adjacent their respective lower ends, as shown in FIGURE 1. Additionally, criss-crossing follower support members 50 and 52 may be provided. Each of the follower members is pivotally connected to one end of the roll bar, as at 54 and 56, with the lower ends, 58 and 60, slideably captivated in the web 62 of the intermediate support bar 26. The web 62 is provided with a pair of depressed floor areas 64 and 66, one area on each side of the longitudinal center line of the automobile, so that as the structure moves upwardly each of the lower ends of the follower members will be dragged across the web to drop and to be trapped in a position of rest in the depressed floor area to support the roll bar against side forces.

Thus, it is clear from the foregoing and as illustrated in FIGURE 2, that, when the structure is in the extended position, the roll bar underlies and acts as a sturdy support rib for the automobile roof to provide a central protected area in the cab, the roof of which will not easily be crushed or caved in.

Means are provided for releasing the detent pins 42 and 44 so that the energy stored in the cylindrical housings of the support legs may drive the roll bar into the roof reinforcing position. For instance, if the energy source is a supply of fluid under pressure, as indicated by the fluid intake line 68 adjacent the base of the cylindrical housing of the support leg 16 at the lower left of FIGURE 1, when the pins 42 and 44 are released by the means generally designated 70, the extensions acting as pistons are driven upwardly. The means 70 which is shielded under the intermediate support bar 28 includes an arm 72 which is the core of a solenoid 78 and two lengths of cable 76 and 74 attached to the arm 72. Each of the cable lengths is connected at the distal end thereof to one of the pins and supported intermediate their respective lengths by a pulley 80 and 82. Thus, when the coil windings of the solenoid are energized, the roll bar will be released as the cables pull the detent pins out of engagement with the extensions for permitting upward movement of the roll bar into the reinforcing position shown in dotted lines in FIGURE 2.

Actuating means, including the electrical circuit 11, are provided for the solenoid. Since there are two conditions at which an impact may occur, first, when the auto is standing still, and second, when it is moving, the electrical circuit includes two branches 84 and 86, each of which is adapted to meet one of the aforesaid conditions.

Concerning the first condition, reference will now be made to the circuit 84. It includes the energy source or battery 87, which is common to both of the circuits and a conductive path 88 leading to a switch 89 which is in series with the windings or coil of the solenoid 78. The switch 89 is of the type which includes a first and a second contact 90 and 92 with a switch arm 94 arranged such that it is pivotal to close the circuit 84 by engagement either with the contact arm 90 or 92 upon an impact sufficient to cause it to pivot with respect to a pivotal mounting 96. In the event of such an impact, when the automobile is standing still, the switch will complete the circuit and actuate the means 70, with the circuit being completed through the ground 98.

In the case of a moving automobile, the ignition key 100 will be turned to an on position which will prohibit current flow through the circuit 84 and permit the current to flow through the circuit 86 to a governor switch 102, the arm of which is connected to any moving part of the vehicle such that it will be a normally closed switch whenever the car is in motion. The governor switch 102 is in series with the solenoid 78 and in the circuit 86, intermediate the governor switch and the solenoid, a switch 104 is provided. The switch 104 is normally open to prohibit current flow to the solenoid; it may be included in the conventional seat belt 106 and arranged to be closed upon an unusual force being applied to the seat belt sufficient to stretch it or pull it so that the arm 108 bridges the contacts 110 and 112 of the switch and closes the circuit for actuating the roll bar. It is not necessary that the governor switch 102 be included in the circuit 86, since there will be occasions when the automobile will be standing still with the ignition turned on; however, there are other installations, such as in racers where the governor switch is desirable.

Thus, it is seen that irrespective of whether the automobile is standing still or moving, the roll bar is poised and ready for release to be driven by the energy source into the roof reinforcing position for protecting the occupants from severe injury which is so often occasioned by a cave-in of the roof. It will be apparent that the electrical switch housing 114 to which the key is connected may be arranged such that either the circuit 84 or 86 is operable at any one time but that both are not operable at any one instant.

As is perhaps well known, certain persons have not become accustomed to using seat belts and it would be apparent from the foregoing that the electrical circuit 84 may provide for simultaneous operation of the switches 89 and 104 so that the apparatus is poised at all times for release and upward thrust into the reinforcing position in the event of an impact. In the event that the seat belt is not used, under such circumstances and in order to obviate the possibility that the lower ends 58 and 60 of the follow members 50 and 52 might slip out of their captivation in the web 62 of the intermediate support bar 26 on the occurrence of a sudden impact and a substantial tilting of the vehicle before the switch 89 closes to activate structure, means may be provided to positively constrain the lower ends 58 and 60 to travel in engagement with the web 62. For instance, a spring may be provided to join the lower ends 58 and 60 and normally urge them downward and toward one another or, alternatively, guide pins may be provided for travel in slots provided in the flanges of the intermediate support bar 26 extending to the depressed floor areas 64 and 66 respectively.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. An automobile safety device to reinforce the roof of an automobile comprising, a roof reinforcing roll bar having spaced extensible support legs, each of said legs being adapted to be anchored to the frame of an automobile in spaced apart relation in a common transverse plane behind the seat in the automobile cab, first means energizable to drive the roll bar from a first lowered position, upwardly into a second raised position in companulate relation with the roof line of the cab to reinforce it, second means responsive to impact on the auto to energize said first means, and third means to normally hold the roll bar in said lowered position and released in response to energization of said second means.

2. A vehicle safety device as set forth in claim 1, said third means comprise an electrical circuit including a source in series with a solenoid and a normally open first switch, said first switch being operable to close said circuit in response to an impact to the vehicle.

3. The device of claim 2, a safety seat belt associated with the seat of the automobile, for use by the occupant thereof, a second switch operatively associated with said belt and operated by and in response to a predetermined tension on said belt, and circuit means connecting said second switch in parallel with said first switch.

4. A vehicle safety device as set forth in claim 1 wherein criss-crossing follower members are provided, each of said follower members being pivotally connected at their respective upper ends to spaced points on the roll bar and at their lower ends being slidably captivated for travel towards one another on upward movement of the roll bar while in engagement with an intermediate support bar, said intermediate support bar having a depressed floor area to receive and trap the ends of said follower member.

5. A vehicle safety device as set forth in claim 1, said roll bar being protectively padded exteriorly of the surface thereof.

6. A vehicle safety device adapted to be anchored to the frame of a vehicle in a transverse plane in the cab comprising a first and a second spaced leg support, a roof reinforcing roll bar having a depending leg at each end telescopically received in one of the said supports, means connecting the support and legs to normally urge the roll bar upwardly, the said roll bar being normally in a lowered position, means releasably connecting the legs and supports to hold the roll bar in the lowered position, and actuating means responsive to an impact on the vehicle to release the said means connecting the legs of the supports for rapid travel of the roll bar into an upward position.

7. A vehicle safety device as set forth in claim 6 wherein mutually inter-cooperating means are provided on the supports to engage the legs and limit upward travel of the roll bar.

8. A vehicle safety device as set forth in claim 6 wherein an intermediate transverse support member is provided connecting the said supports to strengthen it.

9. In a safety device for an automotive vehicle having a floor, a body reinforcing roll bar, means for mounting said bar on a vehicle for movement from a first lowered position adjacent the floor thereof, to a second raised position above the floor, first means urging said bar into said second position, second means releasably holding said bar in first position against the urge of said first means, and third means operating said second means to release said bar for actuation to second position by said first means.

10. The device of claim 9, said third means being rendered effective by and in response to external impact on the vehicle.

11. The device of claim 9, said mounting means comprising first and second posts to be secured to an automotive vehicle in transversely spaced parallel upright positions, said roll bar comprising a U-shaped element including depending spaced parallel legs each vertically slidable on and with respect to a respective one of said first and second posts.

12. The device of claim 11, said posts being tubular, each said leg being tubular and slidably fitting a respective one of said posts.

13. The device of claim 11, said second means comprising first and second detents each carried by a respective one of said posts and movable from a holding position engaging a respective leg of said roll bar in its said first position, to a release position, said third means comprising a solenoid and connections between said detents and said solenoid, moving said detents to release position by and in response to energization of said solenoid.

14. The device of claim 13, said third means also including a circuit including a normally open switch energized by and in response to impact.

15. The device of claim 9, said third means comprising a safety belt for use by an occupant of the vehicle, and means operated by and in response to tension in said safety belt to release said bar for movement to second position.

References Cited by the Examiner

UNITED STATES PATENTS

| | | | |
|---|---|---|---|
| 2,194,390 | 3/1940 | Hubbard | 296—84 X |
| 2,586,063 | 2/1952 | Kurtz | 280—150 |
| 2,929,637 | 3/1960 | Papacosta | 280—150 |
| 3,214,211 | 10/1965 | Setina | 296—24 |

FOREIGN PATENTS 1,375,036 9/1964 France.

KENNETH H. BETTS, *Primary Examiner.*